United States Patent Office 3,073,460
Patented Jan. 15, 1963

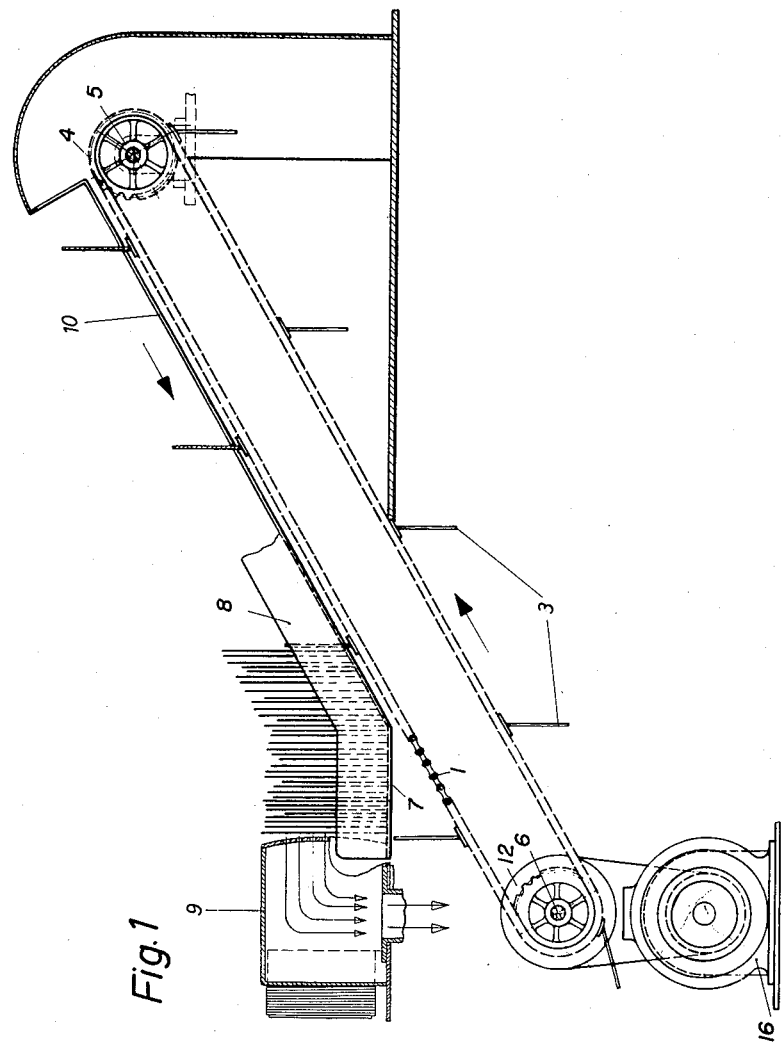

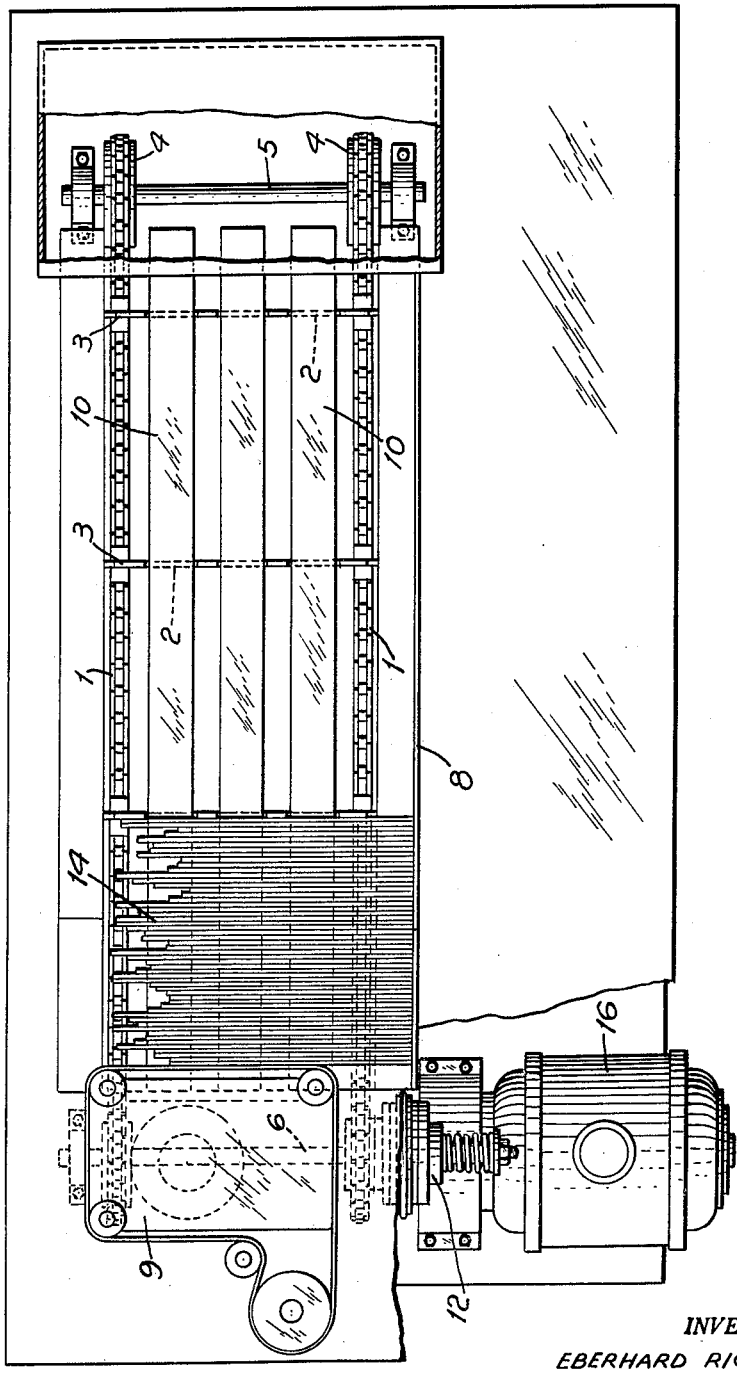

3,073,460
EQUIPMENT FOR CONTINUALLY CHARGING AN EDGEWISE CONVEYING SYSTEM
Eberhard Richert, Berlin-Steglitz, and Rudolf Schneider, Berlin-Charlottenburg, Germany, assignors to International Standard Electric Corporation, New York, N.Y., a corporation of Delaware
Filed Mar. 1, 1960, Ser. No. 12,172
Claims priority, application Germany Mar. 2, 1959
5 Claims. (Cl. 214—7)

The present invention relates to an equipment for continually charging conveying systems, such as pneumatically operated pulling-off devices, of the kind in which flat articles travel on edge. The invention can be used, for example, in post-office operations which, in the course of mechanization and automation, employ conveying machines which are supposed to carry out the separating, culling, and sorting of letters or cards. When these machines are supposed to be entirely or fully utilized then no idle or unoccupied times, and no retrace times may occur during the charging of the machine. This fact is taken into consideration by the invention, and the novel equipment provides a substantial improvement to the hitherto employed types of charging arrangements.

A principle which has been often employed provides that the dispatch articles are mounted to a movable, open carriage. This carriage is moved under an equal pressure and on guide rails against the articles to be conveyed which, in turn, press against the pulling-off device of the conveying system or the treating (or processing) machine. When the filling-degree decreases, the carriage passes underneath the pulling-off device, and thus always supplies the pulling-off device with new dispatch articles, which are continuously pulled-off by the device and fed to either the conveying path or the processing (treating) machine. After the carriage has been discharged it has to be withdrawn and re-charged. This, however, is followed by a period of inoccupancy, because during the retrace time of the carriage, and during the time required to re-charge the carriage, no articles are fed to the input of neither the conveying system nor the processing machine. The processing machine is thus only discontinuously in operation, so that the economy of operation of the system is not fully utilized.

The equipment according to the invention avoids these disadvantages by providing, for the delivery of flat articles travelling on edge to a conveying system, a kind of a ramp which is longitudinally slotted. In these longitudinal slots upright-standing fingers or pairs of fingers rotate in the direction of movement of the dispatch articles. These fingers constantly press against the dispatch articles and, shortly in front of the input of the edgewise conveying system, slide to disappear underneath the ramp. The ramp itself consists of two or more sliding sheets arranged at small spaced relations, and under these sheets a belt or pair of chains are in constant rotation. The fingers are mounted to this belt or to the pair of chains which, shortly before the end of its path, are bent out of the direction of the sliding surface. The arrangement can also be made in a way that the sliding plates or sheets are bent away from the belt or pair of chains. The fingers or pairs of fingers are arranged to slide in the spaces between these plates or sheets.

The invention will be more readily understood by reference to the accompanying drawings, in which:
FIG. 1 shows a side view, and
FIG. 2 shows a top view of an example of embodiment of the invention.

The ramp consists of several parallel arranged sheets 10, at the lateral boundaries of which the two chains 1 rotate, which are connected with one another by way of straps 2. To these straps the compression fingers 3 are mounted. The chains run over chain or sprocket wheels 4 which are seated in pairs on the common shafts 5 and 6. Via friction clutch 12 the chain 1 is coupled to a driving motor 16. The chain drive is inclined by about 30° with respect to the horizontal line. In a direct spacing from the chain drive the sliding or running sheets or plates 10 are arranged. Shortly in front of the path between the wheels 4 these sheets 10 are bent-off in the horizontal line 7. One of the marginal sheets or strips of sheet is provided with a vertical wall 8 on which the dispatch articles are aligned by one of their edges. As a receiving station the drawing shows a suction-operated separating device 9 by which the articles are individually pulled off the stack.

The articles to be conveyed are placed on the sliding sheets 10 between two fingers 3 and, by the movement of the chain 4, are fed on to the ramp in front of the receiving station. The pair of chains 4 extend at an angle in relation to the horizontal line, so that the fingers 3 are led underneath the bent-off sheets 10 shortly before reaching the receiving station 9. The conveyor belt is thus charged with stacked dispatch articles at sufficiently long time intervals. This charging of the conveyor belt needs not be performed at absolutely regular time intervals, it is merely sufficient that the space between two rows of compression fingers is filled up before the stack in front of the receiving station has been carried away. Accordingly, the belt also permits partial fillings or chargings without the dispatch articles falling over, due to the lacking counter support. The drive via a friction clutch ensures a practically constant pressure of the compression fingers upon the dispatch articles. In the event of any possible gaps between the stacks of dispatch articles, that is, in the case of a partial filling or charging of the belt, the latter is temporarily accelerated, so that no noticeable interruption appears in the continuity of supply.

While we have described above the principles of our invention in connection with specific apparatus, it is to be clearly understood that this description is made only by way of example and not as a limitation to the scope of our invention as set forth in the objects thereof and in the accompanying claims.

What is claimed is:
1. Equipment for continuously charging flat articles to an edgewise conveying system which is disposed below the feeding point of the equipment comprising a ramp having a downwardly inclined first portion and a horizontal second portion disposed adjacent the charging point of the system to be charged, said first and second portions of said ramp further comprising a plurality of plates disposed in spaced relation to each other and adapted to slidably support articles to be charged to the conveying system, a plurality of vertical fingers disposed in the spaces between said plates, said fingers being permanently mounted in cooperating pairs transversely across the direction of feed of the flat articles and successive pairs of said fingers being spaced apart in the direction of feed, means to move said fingers slantingly downward through said spaces in the direction of feed of the charging articles whereby charging articles placed adjacent said fingers are conveyed downwardly toward said system to be charged and each of said fingers exerts a constant pressure against each other and against said system to be charged, said horizontal portion being of such length and the angle between said horizontal portion and said downwardly inclined portion being such that said fingers pass through said spaces between said plates in said horizontal portion when passing out from between said spaces and beneath the horizontal portion of said system.

2. Equipment according to claim 1 wherein said means to move said fingers comprises a pair of endless chain conveyors disposed beneath said inclined portion of said ramp and having said pairs of fingers mounted thereon, sprockets on which said chains are mounted, a common shaft for each pair of sprockets, and means to rotate said shafts.

3. Equipment according to claim 2 wherein said means to rotate said shafts further comprises a driving means and a friction clutch, said driving means being connected to one of said common shafts by said friction clutch whereby a constant pressure is exerted on said articles by said fingers and further where the downward progress of the articles is accelerated during periods of light loading to further provide a nearly constant pressure on said articles.

4. Equipment according to claim 3 wherein said ramp is further comprised of a vertical side member connected to one of said plates whereby a guiding edge is formed to aid in the alignment of the flat articles.

5. Equipment according to claim 4 wherein said downwardly inclined first portion of said ramp is inclined at an angle of 30 degrees.

References Cited in the file of this patent

UNITED STATES PATENTS

| | | |
|---|---|---|
| 924,637 | Cox | June 15, 1909 |
| 2,138,306 | Patrick | Nov. 29, 1938 |
| 2,252,469 | Nyberg | Aug. 12, 1941 |
| 2,712,141 | Sieb | July 5, 1955 |
| 2,912,925 | Rabinow | Nov. 17, 1959 |